(12) United States Patent
Gaither et al.

(10) Patent No.: US 6,938,071 B1
(45) Date of Patent: Aug. 30, 2005

(54) FAULT TOLERANT STORAGE SYSTEM HAVING AN INTERCONNECTION FABRIC THAT ALSO CARRIES NETWORK TRAFFIC

(75) Inventors: Blaine D. Gaither, Fort Collins, CO (US); Bret A. McKee, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 608 days.

(21) Appl. No.: 09/703,428

(22) Filed: Oct. 31, 2000

(51) Int. Cl.[7] ............................................. G06F 15/16

(52) U.S. Cl. ..................... 709/213; 709/249; 370/428

(58) Field of Search ......................... 709/201, 226,
709/235, 203, 213, 249, 202, 206; 714/4,
714/8, 39, 7; 370/218, 236, 242, 428; 711/162;
379/265, 266

(56) References Cited

U.S. PATENT DOCUMENTS

| | | | | |
|---|---|---|---|---|
| 5,513,314 A | * | 4/1996 | Kandasamy et al. | 714/6 |
| 5,809,543 A | * | 9/1998 | Byers et al. | 711/162 |
| 5,815,649 A | * | 9/1998 | Utter et al. | 714/6 |
| 5,848,227 A | * | 12/1998 | Sheu | 714/4 |
| 5,987,432 A | * | 11/1999 | Zusman et al. | 705/35 |
| 6,105,122 A | * | 8/2000 | Muller et al. | 712/1 |
| 6,189,111 B1 | * | 2/2001 | Alexander et al. | 714/8 |
| 6,212,161 B1 | * | 4/2001 | Regula | 370/223 |
| 6,421,711 B1 | * | 7/2002 | Blumenau et al. | 709/213 |

FOREIGN PATENT DOCUMENTS

WO    WO94/00816    1/1994

OTHER PUBLICATIONS

IETF: RFC 970, "On Packet Switches With Infinite Storage", Nagle, J., Dec. 1985.*
Elliston, B., "Encapsulating IP with the Small Computer System Interface," Compucat Research, May 1997. pp. 1-5.

* cited by examiner

*Primary Examiner*—Marc D. Thompson
(74) *Attorney, Agent, or Firm*—David A. Plettner (57) ABSTRACT

A networked system includes a fault tolerant storage system (FTSS) having an interconnection fabric that also carries network traffic. A plurality of servers are coupled to an FTSS via an FTSS interconnection fabric. As soon as a packet is received from a sending node, the packet is committed to reliable, persistent, and fault-tolerant storage media within the FTSS, and will not be lost. If the destination node is one of the servers coupled to the FTSS, the FTSS can send an acknowledgment to the sending node guaranteeing delivery to the destination node, even though the destination node has not yet received the packet. The packet is then transmitted to the receiving node, with the receiving node sending an acknowledgment to the FTSS when the packet has been received successfully. At this point, the FTSS can remove the packet from the storage media, or retain the packet in a packet queue for a period of time to allow an application to reconstruct a network dialog in the event of an error or other type of failure. The present invention also allows packets be routed between servers coupled to the FTSS and nodes coupled to an external network.

36 Claims, 9 Drawing Sheets

FAULT TOLERANT STORAGE SYSTEM HAVING AN INTERCONNECTION FABRIC THAT ALSO CARRIES NETWORK TRAFFIC

CROSS REFERENCE TO RELATED APPLICATION

This application contains subject matter related to a co-pending application entitled "A Method and Apparatus for Passing Messages Using a Fault Tolerant Storage System" by Blaine D. Gaither et al. This application is hereby incorporated by reference, is assigned to the same assignee as the present application, and was filed on Oct. 31, 2000, which is also the date on which the present application was filed.

FIELD OF THE INVENTION

The present invention relates to network communication between computer systems. More specifically, the present invention relates to a plurality of computer systems and other nodes coupled to a fault tolerant storage system, wherein the interconnection fabric of the fault tolerant storage system is also used to carry network traffic.

DESCRIPTION OF THE RELATED ART

In the art of computing, various types of input/output (I/O) devices are used to transmit data. One type of I/O category known in the art relates to storage, and includes device such as hard disk drivers, fault tolerant storage systems, backup systems, floppy drives, CD-ROM drives, and the like. Another type of I/O category known in the art relates to networking. Networked computer systems and other nodes are typically coupled using a network fabric such as Ethernet, Fiber Distributed Data Interface (FDDI), Asynchronous Transfer Mode (ATM), token ring, and the like. Historically, developments in storage-related I/O have tended to occur independently from developments in network-related I/O. In addition, the interconnection fabrics used to couple storage devices to computer systems have tended to be completely separate from the interconnection fabrics used to couple together computers and other nodes via a network.

To better understand these interconnection fabrics, first consider how computer systems are coupled together via a network. In the art of computer networking, protocol stacks are commonly used to transmit data between network nodes that are coupled by network media. Network nodes include devices such as computer workstations, servers, network printers, network scanners, and the like. To harmonize the development and implementation of protocol stacks, the International Standards Organization (ISO) promulgated an Open System Interconnection (OSI) Reference Model that prescribes seven layers of network protocols.

Figure 1:
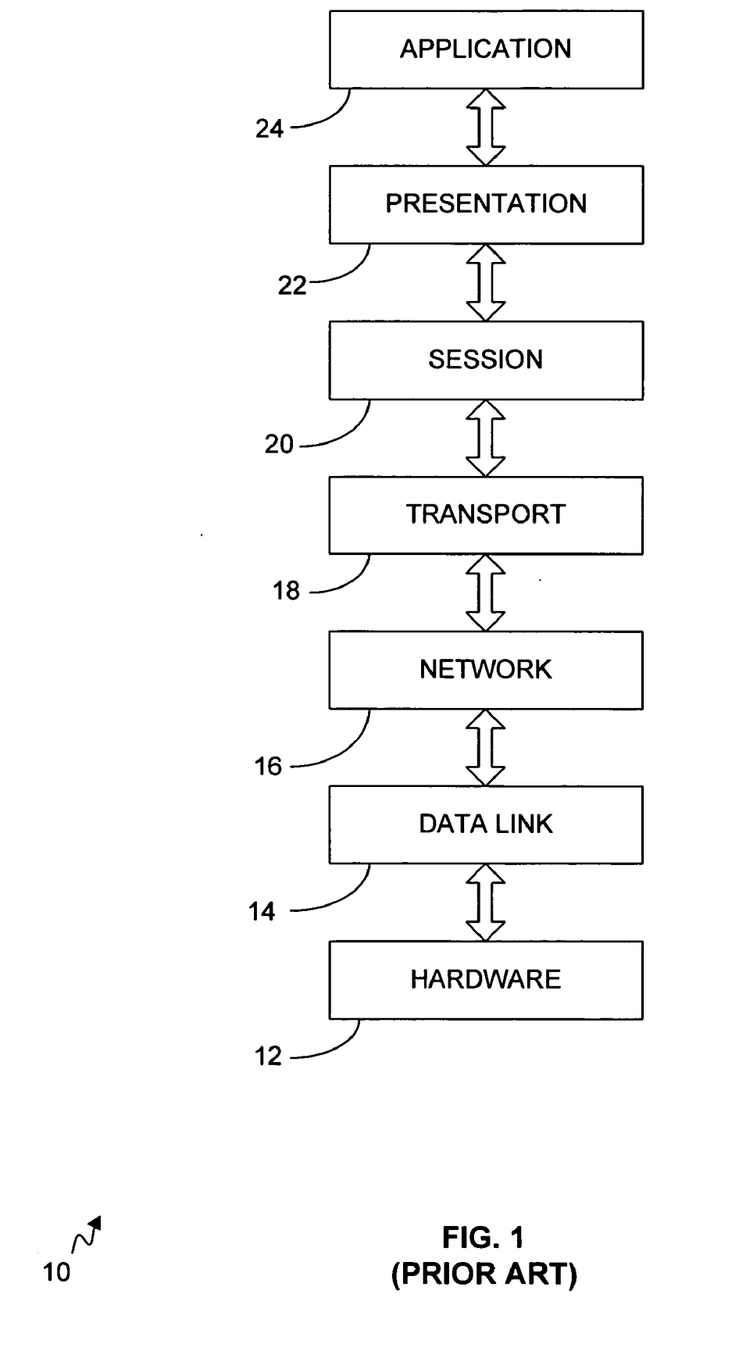
FIG. 1 is a block diagram of the prior art International Standards Organization (ISO) Open System Interconnection (OSI) Reference Model, which prescribes a seven layer network protocol stack.

FIG. 1 is a block diagram 10 of the OSI Reference Model. The model includes a hardware layer 12, a data link layer 14, a network layer 16, a transport layer 18, a session layer 20, a presentation layer 22, and an application layer 24. Each layer is responsible for performing a particular task. Hardware layer 12 is responsible for handling both the mechanical and electrical details of the physical transmission of a bit stream. Data link layer 14 is responsible for handling the packets, including generating and decoding the address used by the hardware protocol and any error detection and recovery that occurred in the physical layer. For example, in an Ethernet network, data link layer 14 is responsible for generating and decoding the media access control (MAC) address. Network layer 16 is responsible for providing connections and routing packets in the communication network, including generating and decoding addresses used by upper level protocols and maintaining routing information for proper response to changing loads. For example, in the TCP/IP protocol, network layer 16 typically handles the IP portion of the protocol, and is responsible for generating and decoding the IP address. Transport layer 18 is responsible for end-to-end connections between nodes in the network and the transfer of messages between the users, including partitioning messages into packets, maintaining packet order and delivery, flow control, and physical address generation. For example, in the TCP/IP protocol, the TCP portion of the protocol is typically implemented at transport layer 18. Session layer 20 is responsible for implementing the process-to-process protocols. Presentation layer 22 is responsible for resolving the differences in formats among the various sites in the network, including character conversions, and duplex (echoing). Finally, application layer 24 represents applications, such as electronic mail clients and server, distributed databases, web browsers, web servers, and the like.

Before the ISO promulgated the OSI Reference Model, the Defense Advanced Research Projects Agency (DARPA) promulgated the ARPNET Reference Model. The ARPNET reference model includes four layers, a network hardware layer, a network interface layer, a host-to-host layer, and a process/application layer.

As their names imply, the OSI and ARPNET Reference Models provide guidelines that designers of protocols may or may not choose to follow. However, most networking protocols define layers that at least loosely correspond to a reference model.

In the field of computing, there are many popular protocols used to transmit data between network nodes. For example, TCP/IP, AppleTalk®, NetBEUI, and IPX are all popular protocols that are used to transmit data between servers, workstations, printers, and other devices that are coupled to computer networks.

It is common for several protocols to operate concurrently within a single network node, even if the network node has a single network interface. For example, a typical computer workstation may use TCP/IP to communicate over the Internet, and IPX to communicate with a network server. Likewise, a printer may be configured to receive print jobs using either the AppleTalk® protocol or the NetBEUI protocol. Typically these protocols sit on top of lower level hardware protocols. For example, it is common for two computer systems coupled via an Ethernet network to communicate using the TCP/IP protocol. Generally, a software routine existing at data link layer 14 or network layer 16 routes data packets between the network adapter and the proper protocol stack.

As mentioned above, data link layer 14 is responsible for handling the packets, including generating and decoding of the address used by the hardware protocol and any error detection and recovery that occurred in the physical layer. However, many network fabrics, such as Ethernet, do not provide error recovery, and delivery of packets is neither acknowledged nor guaranteed. Accordingly, if two network nodes are coupled using an Ethernet fabric, it is the responsibility of a higher level protocol, such as TCP/IP, to guarantee packet delivery.

In many high-end networked systems, such as an on-line transaction processing system, it is desirable to make the interconnection fabric as reliable as possible by providing hardware layer 12 with the ability to guarantee packet delivery. Doing so provides redundancy, since packet delivery is guaranteed by both the interconnection fabric and the higher level protocol.

Several interconnection fabrics are available to provide guaranteed delivery of packets. For example, ServerNet® is a system interconnect architecture available from Compaq Computer Corporation. ServerNet® hardware ensures data integrity using multiple techniques. For example, command link integrity isolates single-bit errors, cyclic redundancy checks maintain both data and control integrity of transfers crossing the interconnect fabric, and hardware protocol acknowledgments ensure that end-to-end reliable data transfer has occurred. In addition, ServerNet® is capable of providing a high level of availability by incorporating spare alternate paths within a primary interconnection fabric, and providing a fully redundant secondary interconnect fabric with redundant secondary attachments to network nodes. Similar interconnection fabrics are available from other vendors, such as the Coupling Facility provided by IBM Corporation. While interconnection fabrics such as ServerNet® and the Coupling Facility are fast, highly reliable, and fault tolerant, they are also very expensive. Therefore, such interconnection fabrics tend to only be used in applications where these features are important, such as on-line transaction processing systems.

Figure 2:
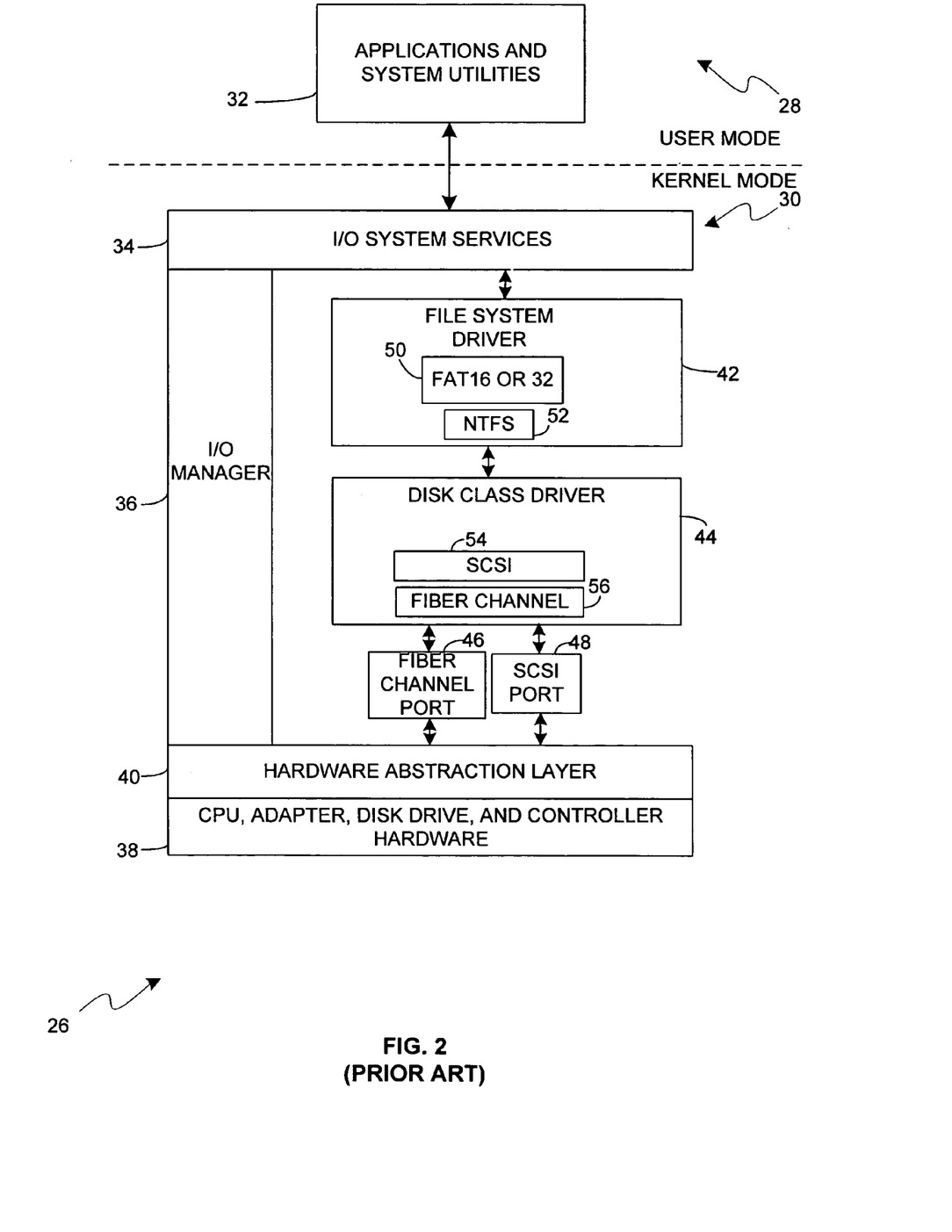
FIG. 2 is a block diagram that illustrate how computer systems have traditionally been coupled to storage devices in the prior art.

Now consider how computer systems have traditionally been to coupled to storage devices. FIG. 2 shows a prior art computer system 26. Only those portions of computer system 26 that are required to understand the file system are shown in FIG. 2. The operating system executes instructions in user mode 28 and kernel mode 30. Typically, applications and system utilities 32 are executed in user mode 28, and I/O system services 34 are executed in kernel mode 30.

I/O system services 34 represents all I/O functions of computer system 26. I/O system services 34 include an I/O manager 36, which manages I/O operations and will be discussed in greater detail below. CPU, adapter, disk drive, and controller hardware block 38 represents the physical computing resources of computer system 26. Hardware abstraction layer 40 couples block 38 to I/O manager 36. The purpose of hardware abstraction layer 40 is to communicate with the resources represented by block 38 (which typically vary between different computer systems) and provide a uniform "abstracted" view of these resources to I/O manager 36.

In FIG. 2, those portions of I/O manager 36 that manage access to the file system are file system driver 42, disk class driver 44, fiber channel port 46, and small computer system interface (SCSI) port 48. File system driver 42 receives file access requests from applications and system utilities 32. The requests are processed by FAT16 or FAT32 block 50 or NTFS block 52 based on the type of file system used on the partition that is the target the request. The FAT16, FAT32, and NTFS file systems are the most common file systems used on a workstation running the Windows 2000®, which is a product of Microsoft Corporation. Of course, other file systems are known in the art.

Consider a file access request to a local hard drive. The request is translated to access the appropriate hard drive sectors based on the file system, and is passed to disk class driver 44. If the target of the request is a SCSI drive, SCSI block 54 handles the request. If the target of the request is a fiber channel drive, fiber channel block 56 handles the request. Of course, other methods of connecting hard drives to computer systems are known in the art, such as the Integrated Drive Electronics (IDE) interface. Thereafter, the request is passed to fiber channel port 46 or SCSI port 48 (based on the hard drive interface type), and the request is completed by hardware abstraction layer 40, and CPU, adapter, disk drive, and controller block 38. The results of the file access request then flow back up to applications and system utilities 32.

As is known in the art, computer systems are typically provided with local hard drives. More recently, it has become common to couple high-end server farms to fault tolerant storage systems (FTSS), such as the SureStore® XP512 Disk Array, which is a product of Hewlett-Packard Company. Fault tolerant storage systems are also available from other companies, such as Hitachi Data Systems Corporation and EMC Corporation.

Typically an FTSS is coupled to a server using a high-speed interface, such as an Ultra160 SCSI interface, a fiber channel interface, or an enterprise system connectivity (ESCON) interface. Such systems are highly reliable and fault tolerant. For example, the SureStore® XP512 Disk Array uses a fault-tolerant, redundant architecture that ensures there is no single point-of-failure, and has a mean time between failure (MTBF) of 2.5 million hours, or alternatively 285 years. Such systems are also incredibly fast. A single fiber channel port can support transfer rates of 100 megabytes per second, and ports can be ganged together to increase transfer rates even further. Moreover, the internal crossbar architecture of the XP512 has a bandwidth of 6.4 gigabytes per second.

Figure 3:
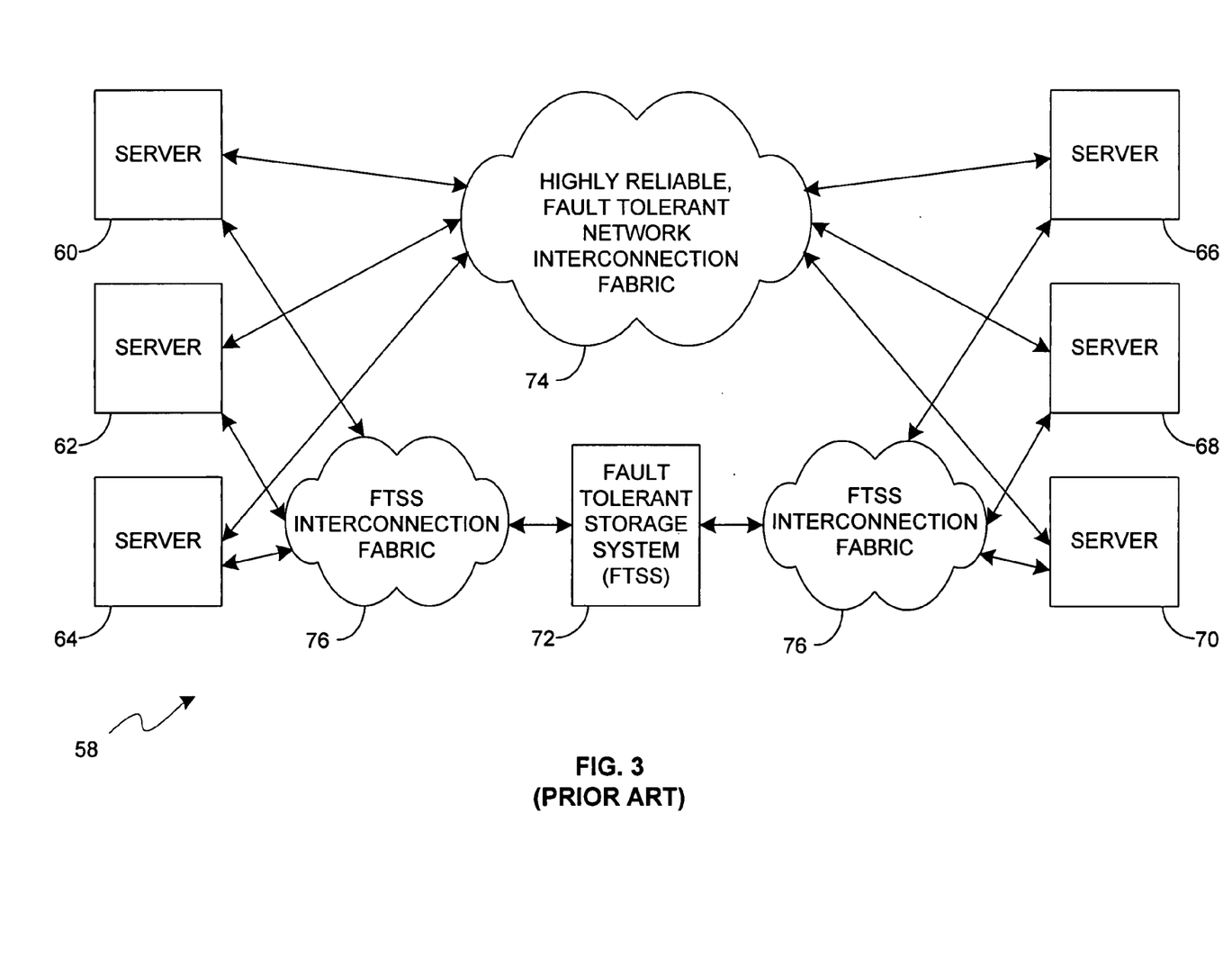
FIG. 3 is a block diagram of a prior art networked system comprising a plurality of servers coupled to a fault tolerant storage system (FTSS), with the servers coupled to each other via a highly reliable, fault tolerant network interconnection fabric.

When configuring high-end applications, such as an online-transaction processing system, it is common for a customer to specify that a server farm be coupled by a highly reliable fault tolerant interconnection fabric, such as Compaq's ServerNet® or IBM's Coupling Facility, and to have all servers coupled to a FTSS, such as Hewlett-Packard's SureStore® XP512 Disk Array. FIG. 3 shows such a prior art system 58. System 58 comprises servers 60, 62, 64, 66, 68, and 70, and fault tolerant storage system (FTSS) 72. Servers 60, 62, 64, 66, 68, and 70 are coupled to FTSS 72 via FTSS interconnection fabric 76 to carry file I/O transactions between the servers and FTSS 72. Typically, interconnection fabric 76 couples each server directly to the FTSS, but does not directly couple the servers to each other. In addition, servers 60, 62, 64, 66, 68, and 70 are coupled to together by highly reliable, fault tolerant network interconnection fabric 74 to carry network traffic between the servers.

Note that interconnection fabrics 74 and 76 are both highly reliable and fault tolerant. Accordingly, a customer configuring a system such as that shown in FIG. 3 ends up paying for two interconnection fabrics. What is needed in the art is a practical way for a customer to use the same highly reliable and fault tolerant interconnection fabric to carry both file I/O transactions and network traffic.

SUMMARY OF THE INVENTION

The present invention is a networked system that includes a fault tolerant storage system (FTSS) having an interconnection fabric that also carries network traffic. In accordance with the present invention, a plurality of servers are coupled to an FTSS via an FTSS interconnection fabric. Typically, the FTSS interconnection fabric will be comprised of high-speed interfaces and related cabling used to connect servers to storage systems, such as small computer system interfaces (SCSI), fiber channel interfaces, or enterprise system connectivity (ESCON) interfaces. In a typical FTSS, these interfaces tend to connect each server directly to the FTSS, but do not connect the servers to each other.

The FTSS not only carries file-related I/O transactions, but also carries network traffic. In essence, the FTSS acts like a router having additional features not found in routers of the prior art. Specifically, the highly reliable and fault tolerant nature of the FTSS and the FTSS interconnection fabric ensures that the FTSS can guarantee delivery of a packet transmitted from a sending node to a destination node. As soon as a packet is received from a sending node, the packet is committed to reliable, persistent, and fault-tolerant storage media within the FTSS, and will not be lost.

Assuming that the destination node is one of the servers coupled to the FTSS, once the packet is safely stored in the FTSS, the FTSS can send an acknowledgment to the sending node guaranteeing delivery to the destination node, even though the destination node has not yet received the packet. Furthermore, once the packet is safely stored in the FTSS, the FTSS can begin transmitting the packet to the receiving node, with the receiving node sending an acknowledgment to the FTSS when the packet has been received successfully. At this point, the FTSS can remove the packet from the storage media, or retain the packet in a packet queue for a period of time. By retaining the packet in a packet queue, if the application receiving the packets suffered some type of failure, a redundant application could then be started and "roll back" processing to a known valid point, and re-retrieve the packets from FTSS to reconstruct the network dialog.

The present invention also allows packets be routed between servers coupled to the FTSS and nodes coupled to an external network. Even though delivery is not guaranteed, this scheme still provides additional reliability because if the interface between FTSS and the external network fails, delivery can be attempted using an alternate network path.

Similarly, remote nodes coupled to an external network can transmit packets to nodes coupled to the FTSS. Should any device or subsystem fail while the FTSS is transmitting the packet to a server coupled to the FTSS, the FTSS can still delivery the packet using a redundant device or subsystem.

The present invention can be realized in a prior art system comprising servers coupled to an FTSS by implementing several relatively straight-forward software modifications in the server software and the FTSS software. Accordingly, the present invention provides a customer with all of the reliability and fault-tolerant advantages of a proprietary network such as Compaq's ServerNet® or IBM's Coupling Facility, without requiring the customer to purchase any additional hardware.

DETAILED DESCRIPTION OF THE PREFERRED EMBODIMENTS

Figure 4:
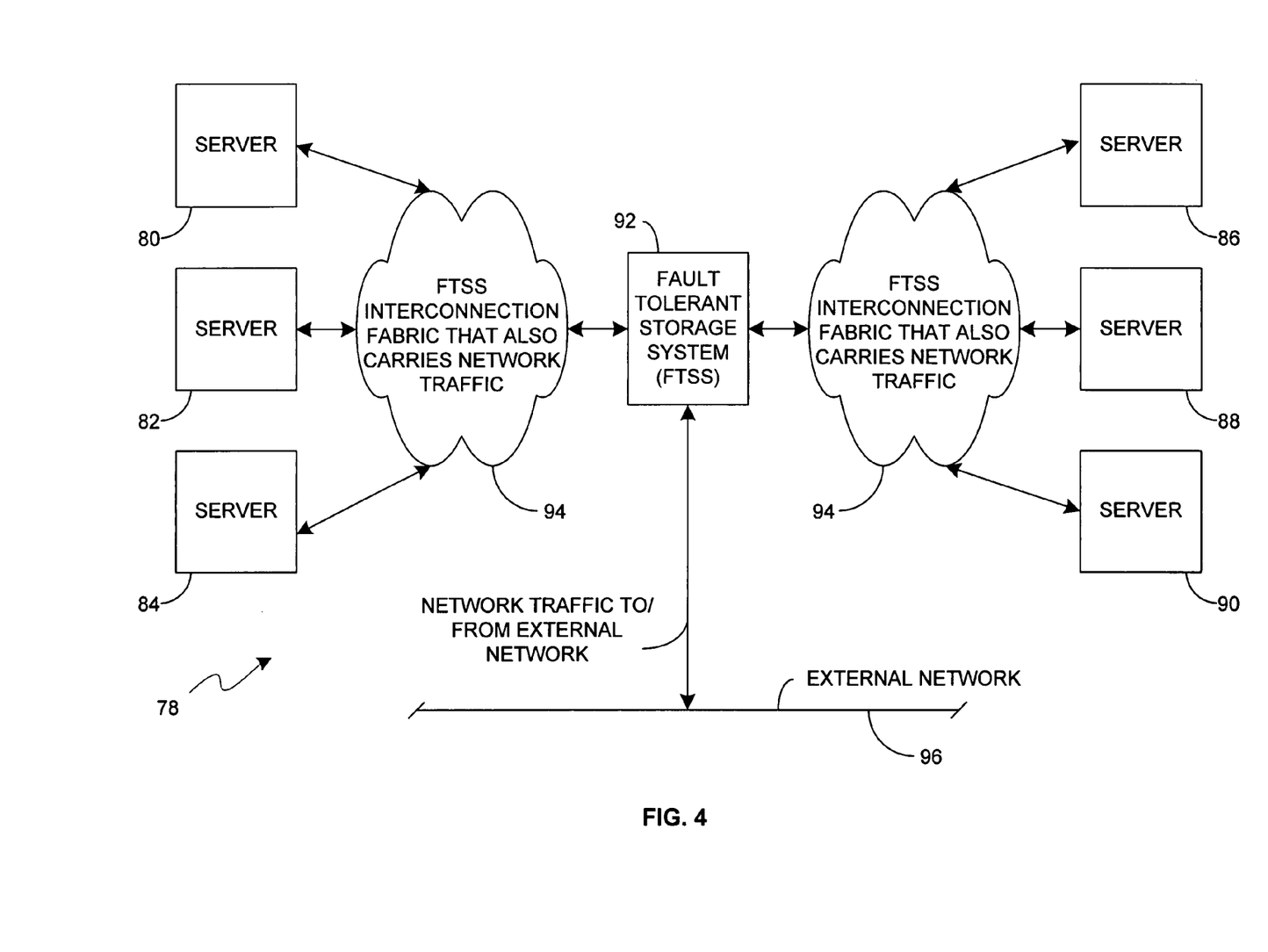
FIG. 4 shows a networked system, in accordance with the present invention.

The present invention is a networked system that includes a fault tolerant storage system having an interconnection fabric that also carries network traffic. FIG. 4 shows a networked system 78 in accordance with the present invention. System 78 includes servers 80, 82, 84, 86, 88, and 90, fault tolerant storage system (FTSS) 92, FTSS interconnection fabric 94, and external network 96. Although only servers are shown in FIG. 4, those skilled in the art will recognize that other network nodes may be coupled to FTSS 92 via fabric 94, such as printers, scanners, backup systems, and the like. As used herein, the terms "node" and "server" may be used interchangeably, as is appropriate in any particular context. Also note that although the term "server" is used to refer to a computer system, the network nodes can also be workstations.

Typically, interconnection fabric 94 will be comprised of high-speed interfaces and related cabling used to connect servers to storage systems, such as small computer system interfaces (SCSI), fiber channel interfaces, or enterprise system connectivity (ESCON) interfaces. In a typical FTSS, these interfaces tend to connect each server directly to the FTSS, but do not connect the servers to each other.

In accordance with the present invention, FTSS 92 not only carries file-related I/O transactions, but also carries network traffic. In essence, FTSS 92 acts like a router, except that FTSS 92 provides additional features not present in a router. Specifically, the highly reliable and fault tolerant nature of FTSS 92 ensures that FTSS 92 can guarantee delivery of a packet transmitted from a sending node to a destination node even though the destination node has not yet received the packet. To see how this is accomplished, first consider a typical FTSS, such as the SureStore® XP512 Disk Array, which is a product of Hewlett-Packard Company. The XP512 has a battery-protected fully redundant nonvolatile write cache that can range in size from 2 gigabytes to 32 gigabytes. As soon as a packet is received from a sending node, the packet is committed to the nonvolatile write cache. FTSS 92 may also write the packet to a redundant array of independent disks (RAID), which can either by used to provide additional redundancy, or can be used to free-up additional space in the write cache. However, for performance reasons, and because the packet will typically only need to be present in the FTSS for a short period of time, it may be desirable to keep the packet in the write cache until the packet has been successfully received by the receiving node.

On the other hand, one implementing the present invention may wish to retain transmitted packets for a certain period of time in the FTSS. This could be useful, for example, if the application receiving the packets suffered some type of failure. A redundant application could then be started and "roll back" processing to a known valid point, and re-retrieve the packets from FTSS to reconstruct the network dialog. In this situation, it will be desirable to retain the packets in a packet queue that is stored on the RAID of the FTSS. Old packets can eventually be eventually removed from the packet queue using a technique known in the art, such as an expiration date and time, or a first-in first-out (FIFO) queue. Since a RAID in a typical FTSS can be configured to store terabytes of data, the FTSS is ideally suited to maintain the packet queue.

Once the packet is stored in the nonvolatile write cache or the RAID of FTSS 92, the packet will not be lost. Assuming that the destination node is one of the servers coupled to interconnection fabric 94 in FIG. 4, once the packet is safely stored in FTSS 92, FTSS 92 can send an acknowledgment to the sending node guaranteeing delivery to the destination node, even though the destination node has not yet received the packet. Furthermore, once the packet is safely stored in FTSS 92, FTSS 92 can begin transmitting the packet to the receiving node, with the receiving node sending an acknowledgment to FTSS 92 when the packet has been received successfully. At this point, FTSS 92 can remove the packet from the write cache and/or the RAID, or retain the packet in the packet queue, as discussed above.

Note that as long as FTSS 92 stores the packet, FTSS 92 can attempt delivery of the packet to the destination node. The connection between a server and FTSS 92 will typically have redundant interfaces. If one interface should fail during transmission of the packet to the destination node, FTSS 92 can retransmit the packet on the other interface. Of course, FTSS 92 can also keep track of the status of the nodes. If a server node is down for some reason (such as maintenance or configuration), or there is some other problem with the node, FTSS 92 can transmit a message to the sending node to notify the sending node that FTSS 92 can not deliver the packet.

FTSS 92 can also route packets between a node coupled to interconnection fabric 94 and another node coupled to another network, such as external network 96 in FIG. 4. For example, assume that server 80 attempts to transmit a packet to a node not coupled by interconnection fabric 96, such as a remote node coupled to the Internet. Server 80 transmits the packet to FTSS 92, and FTSS 92 commits the packet to the nonvolatile write cache or the RAID. At this point, FTSS 92 can send an external network acknowledgment to server 80 indicating that it has received and saved the packet, but cannot guarantee delivery of the packet to the receiving node. Even though delivery is not guaranteed, this scheme still provides additional reliability and fault tolerance. For example, should an interface between FTSS 92 and network 96 fail, FTSS 92 can attempt delivery using an alternate network path.

Similarly, consider that a remote node coupled to external network 96 attempts to transmit a packet to server 80. As soon as FTSS 92 receives the packet, the packet can be committed to the nonvolatile write cache or the RAID. Should any device or subsystem fail while FTSS 92 is transmitting the packet to server 80, FTSS 92 can still delivery the packet using a redundant device or subsystem.

Figure 5:
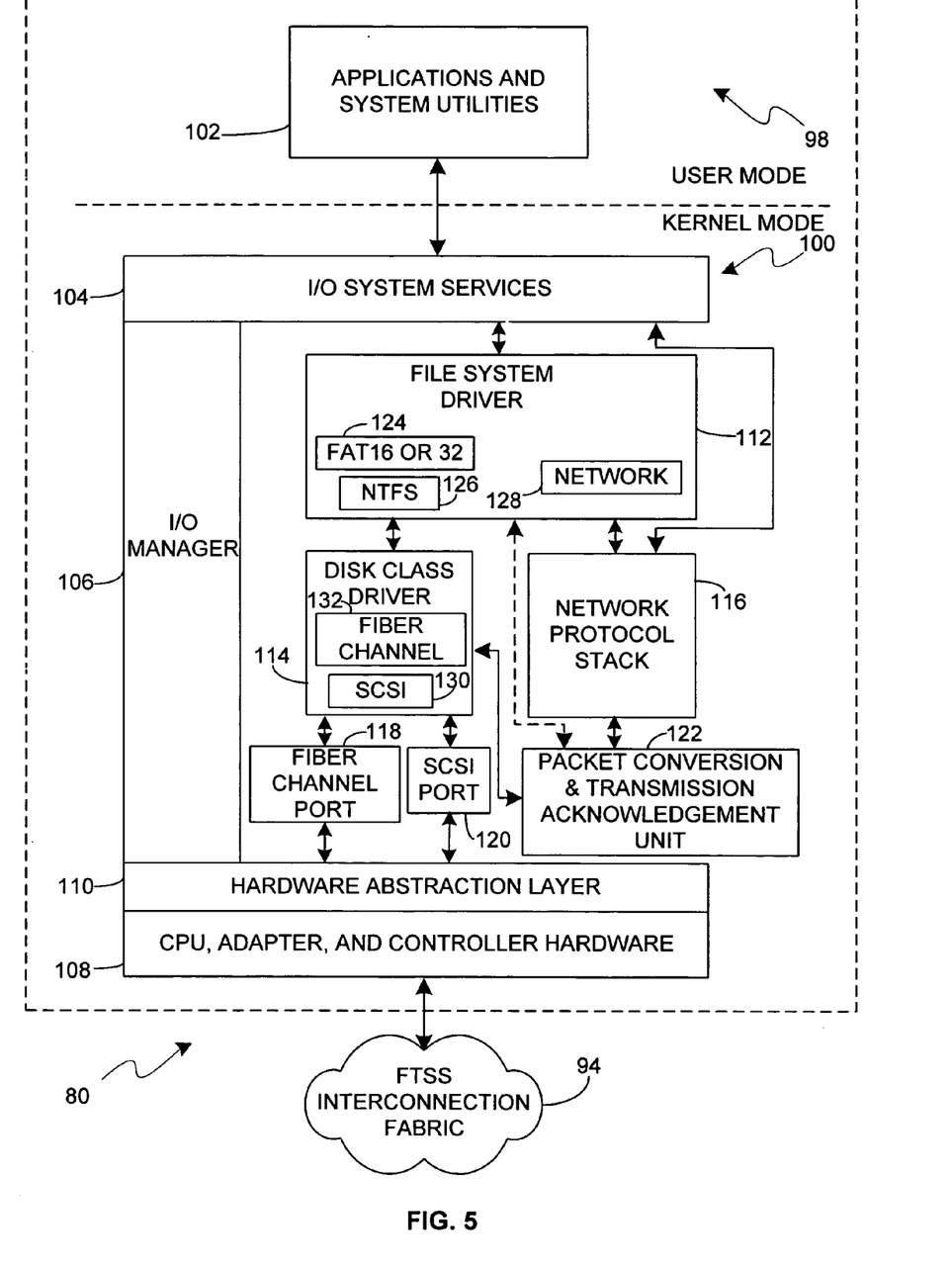
FIG. 5 is a block diagram of a server, in accordance with the present invention.

The present invention can be realized in a prior art system comprising servers coupled to an FTSS by implementing several relatively straight-forward software modifications in the server software and the FTSS software. First consider the server. FIG. 5 is a block diagram of server 80, in accordance with the present invention. Only those portions of server 80 required to understand the present invention are shown in FIG. 5. Assume that server 80 is running the Windows® 2000 operating system, which is a product of Microsoft Corporation. Also assume that server 80 has one or more local hard drives that are accessed via a SCSI controller, and a fiber channel link to FTSS 92.

The operating system executes instructions in user mode 98 and kernel mode 100. Typically, applications and system utilities 102 are executed in user mode 98, and I/O system services 104 are executed in kernel mode 100.

I/O system services 104 represents all I/O functions of server 80, includes file and network I/O functions. I/O system services 104 include an I/O manager 106, which manages I/O operations and will be discussed in greater detail below. CPU, adapter, and controller hardware block 108 represents the physical computing resources of server 80, including the fiber channel interfaces to FTSS 92. Hardware abstraction layer 110 couples block 108 to I/O manager 106. The purpose of hardware abstraction layer 110 is to communicate with the resources represented by block 108 (which typically vary between different computer systems) and provide a uniform "abstracted" view of these resources to I/O manager 106.

In FIG. 5, those portions of I/O manager 106 that manage access to the file system are file system driver 112, disk class driver 114, network protocol stack 116, fiber channel port 118, SCSI port 120, and packet conversion and transmission acknowledge unit 122. Note that when the network is accessed to perform a file request, such as a file request to a mapped network drive, protocol stack 116 is accessed via file system driver 112. Protocol stack 116 is also coupled directly to I/O system services 104. This path is used when an application accesses the network directly, such as a web server providing a web page to a remote user or a database performing interprocess communication transaction via a named pipe.

File system driver 112 receives file access requests from applications and system utilities 102. File system driver 112 determines whether a file access request is attempting to access a file on a local hard drive, or a networked drive. If the file access request is attempting to access a local hard drive, the request is processed by FAT16 or FAT32 block 124 or NTFS block 126 based on the type of file system used on the partition that is the target of the request. The FAT16, FAT32, and NTFS file systems are the most common file systems used on a Windows 2000' server, but of course, other file systems are known in the art. If the file access request is attempting to access a networked drive, the request is processed by network block 128.

Assume that the file access request is attempting to access a local hard drive or FTSS 92. The request is translated to access the appropriate hard drive sectors based on the file system, and is passed to disk class driver 114. If the target of the request is a local SCSI drive, SCSI block 130 handles the request. If the target of the request is FTSS 92 (via the fiber channel interface), fiber channel block 132 handles the request. While the SCSI and fiber channel interfaces are common methods of connecting storage systems to computers, other connection methods are known in the art. Thereafter, the request is passed to fiber channel port 118 or SCSI port 120 (based on the interface type), and the request is completed by hardware abstraction layer 110, and CPU, adapter, and controller block 108. The results of the file access request then flow back up to applications and system utilities 102.

Returning to file system driver 112, now assume that the file access request is attempting to access a networked drive. As mentioned above, such a request is processed by network block 128. The request flows through network protocol stack 116 to packet conversion and transmission acknowledgment unit 122. Similarly, if an application is accessing the network directly, the network request flows from application and system utilities 102, to network protocol stack 116 via I/O system services 104, and then flows to packet conversion and transmission acknowledgment unit 122. Unit 122, in turn, is coupled to disk class driver 114 to transmit network traffic to FTSS 92 via FTSS interconnection fabric 94. Note that the connection between packet conversion and transmission acknowledgment unit 122 and disk class driver 114 is shown as a solid line. The solid line represents one embodiment of server 80. Packet conversion and transmission acknowledgment unit 122 is also coupled to file system driver 112 via a dotted line. The dotted line represents an alternative embodiment. Both embodiments will be discussed below.

In a prior art server, network protocol stack 116 would be coupled directly to a network adapter, and a network request would be transmitted to network media via the network adapter. However, in accordance with one embodiment of the present invention, packet conversion and transmission acknowledgment unit 122 converts outgoing packets to and incoming packet from a format capable of being transmitted over FTSS interconnection fabric 94 via disk class driver 114. This embodiment is represented by the solid line connecting unit 122 and disk class driver 114. Note that different interface protocols use different command sets to transfer data. The fiber channel protocol is extremely flexible. The SCSI protocol, Internet Protocol (IP), High Performance Parallel Interface (HIPPI) protocol, Asynchronous Transfer Mode-Adaption Layer 5 (ATM-AAL5) protocol, Intelligent Peripheral Interface-3 (IPI-3) protocol, and Single Byte Command Code Sets (SBCCS) can all be mapped into the fiber channel protocol. In addition, the fiber channel protocol provides space for future protocols to be accommodated. Those skilled in the art will be able to adapt the teachings herein to convert packets from network protocol stack 116 into a format appropriate for transmission over FTSS interconnection fabric 94 via the solid line connection between packet conversion and transmission acknowledgment unit 122 and disk class driver 114.

An alternative embodiment simply transfers packets by encapsulating each packet in a file and transmitting the packet to FTSS 92 as a file access. This embodiment is represented by the dotted line connecting packet conversion and transmission acknowledgment unit 122 to file system driver 112. To transmit packets using this method, a series of directories can be defined on FTSS 92 to store incoming and outgoing packets as files, with FTSS 92 monitoring these directories to route packets as soon as the packets arrive. Accordingly, packet conversion and transmission acknowledgment unit 122 processes an outgoing packet by converting the packet to a file access and passing the file access to file system driver 112. Similarly, incoming packets are routed from file system driver 112 to packet conversion and transmission acknowledgment unit 122 as incoming files. For outgoing packets, unit 122 would appear to FTSS 92 as any other application performing a file access to FTSS 92. For incoming packets, unit 122 would appear to FTSS 92 as a mapped network drive.

This alternative embodiment has the advantage of requiring fewer modification to server 80 and FTSS 92. In essence, network traffic is piggy-backed on top of the file I/O processing routines as they exist in the prior art. However, this embodiment is slower since packets need to pass through additional layers. In contrast, the first embodiment is faster, however disk class driver 114 must be modified to handle packets that have been encapsulated into the protocol of the interface that couples server 80 to FTSS 92.

Note that packet conversion and transmission acknowledgment unit 122 also processes acknowledgment messages. Acknowledgment messages will be described in greater detail below with reference to the discussion of FTSS 92 in FIGS. 7A and 7B.

If one desired to consider the correspondence between the present invention and the International Standards Organization (ISO) Open System Interconnection (OSI) Reference Model seven layer protocol stack of FIG. 1, packet conversion and transmission acknowledgment unit 122 is somewhat analogous to data link layer 14, which is responsible for handling the packets, including generating and decoding of the address used by the hardware protocol and any error detection and recovery that occurred in the physical layer, as described above.

Returning to the consideration of an outgoing network packet, after the packet has been processed by packet conversion and transmission acknowledgment unit 122, the packet flows to disk class driver 114 (through file system driver 112 in the alternative embodiment), and is processed by fiber channel block 132. Figure channel block 132 transmits the outgoing packet to FTSS interconnection fabric 94. Similarly, an incoming network packet is received at fiber channel port 118, processed by fiber channel block 132 of disk class driver 114, and routed to packet conversion and transmission acknowledgment unit 122. As mentioned above, the packet is also processed by file system driver 112 in the alternative embodiment. After the packet has been processed by unit 22, it flows up through protocol stack 116 and to either file system driver 112 or I/O system services 104, as described above.

Figure 6:
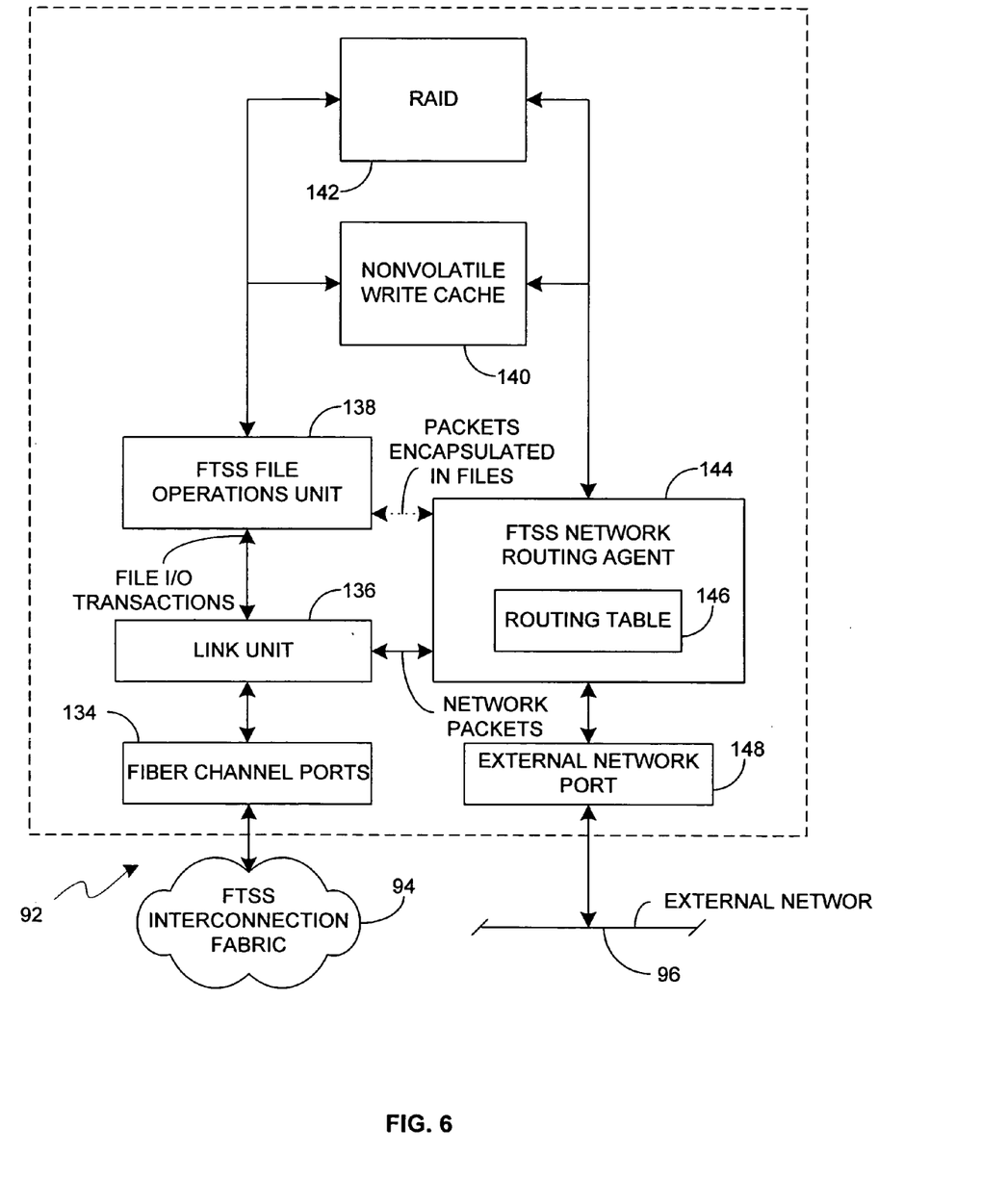
FIG. 6 is a block diagram of fault tolerant storage system (FTSS), in accordance with the present invention.

FIG. 6 is a block diagram of FTSS 92, in accordance with the present invention. FTSS 92 includes fiber channel ports 134 (which are coupled to FTSS interconnection fabric 94), link unit 136, FTSS file operations unit 138, nonvolatile write cache 140, RAID 142, FTSS network routing agent 144 (which includes routing table 146), and external network port 148 (which is coupled to external network 96).

Fiber channel ports 134 are connected to servers 80, 82, 84, 86, 88, and 90 in FIG. 4 via FTSS interconnection fabric 94. Fiber channel ports 134 are also coupled to link unit 136. Link unit 136 separates an incoming data stream into file I/O transactions, which are transmitted to FTSS file operations unit 138, and network packets, which are transmitted to FTSS network routing agent 144. Similarly, link unit 136 combines outgoing packets from agent 144 and outgoing file transactions from unit 138 into an outgoing data stream that is transmitted at fiber channel ports 134. Note that the solid line between link unit 136 and FTSS network routing agent 144 represents the first embodiment described above, wherein network packets are transmitted using the interface protocol. The alternative embodiment is represented by the dotted line connecting FTSS file operations unit 138 to agent 144, wherein packets are transmitted as files. In the alternative embodiment, link unit 136 is not required and FTSS file operations unit 138 is coupled directly to fiber channel ports 134.

File I/O transactions are processed by FTSS file operation unit as is known in the art. Incoming file I/O transactions are first committed to nonvolatile write cache 140 and are then written to RAID 142. Outgoing file I/O transactions are retrieved from RAID 142 and are transmitted to the server that initiated the transactions.

In accordance with the present invention, FTSS network routing agent 144 processes network packets transmitted between the nodes coupled by FTSS interconnection fabric 94, and external nodes coupled to external network 96.

Figure 7A:
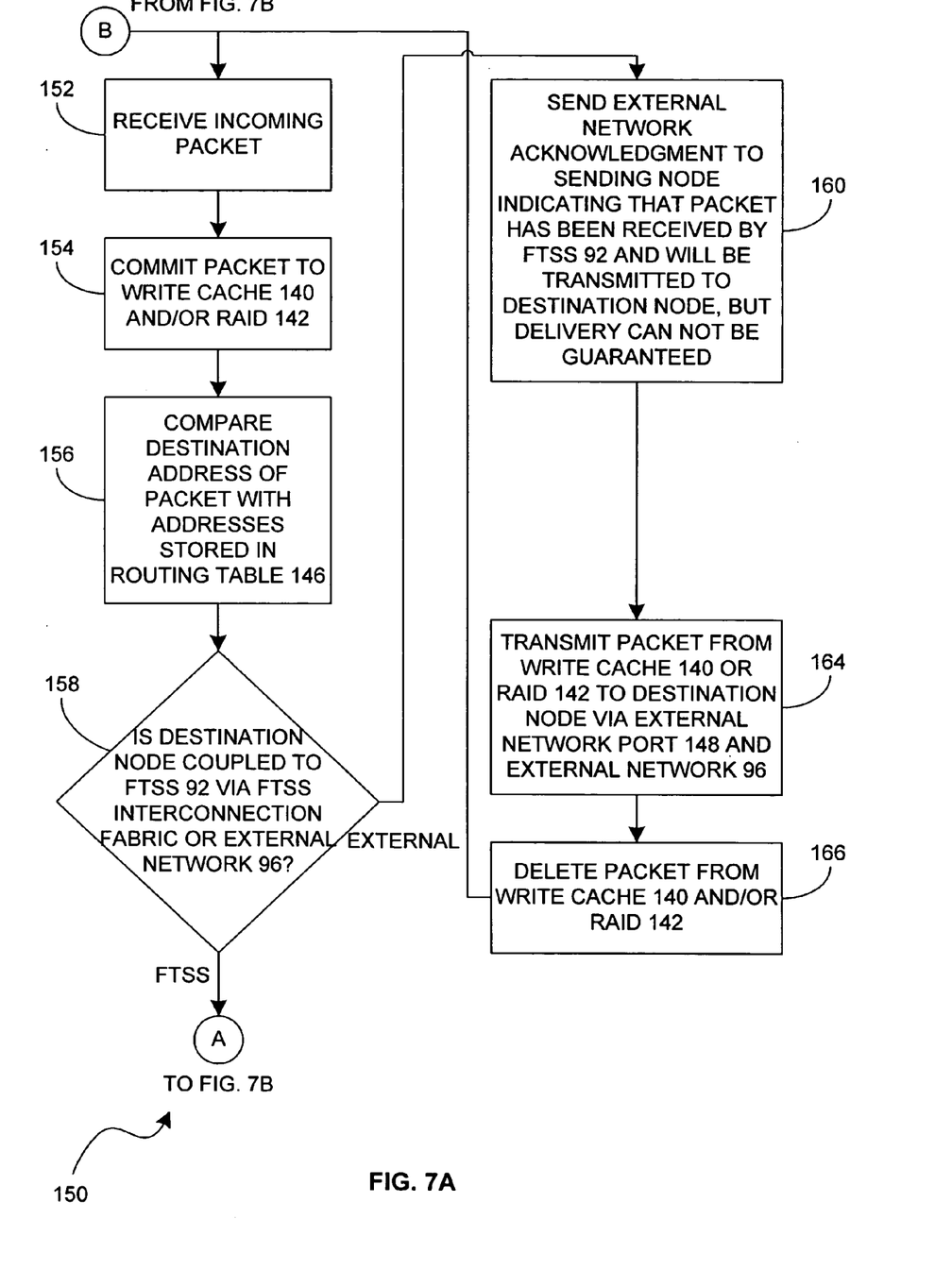
FIGS. 7A and 7B, taken together, show a flowchart that illustrates how an FTSS in accordance with the present invention routes packets between nodes coupled to the FTSS.
Figure 7B:
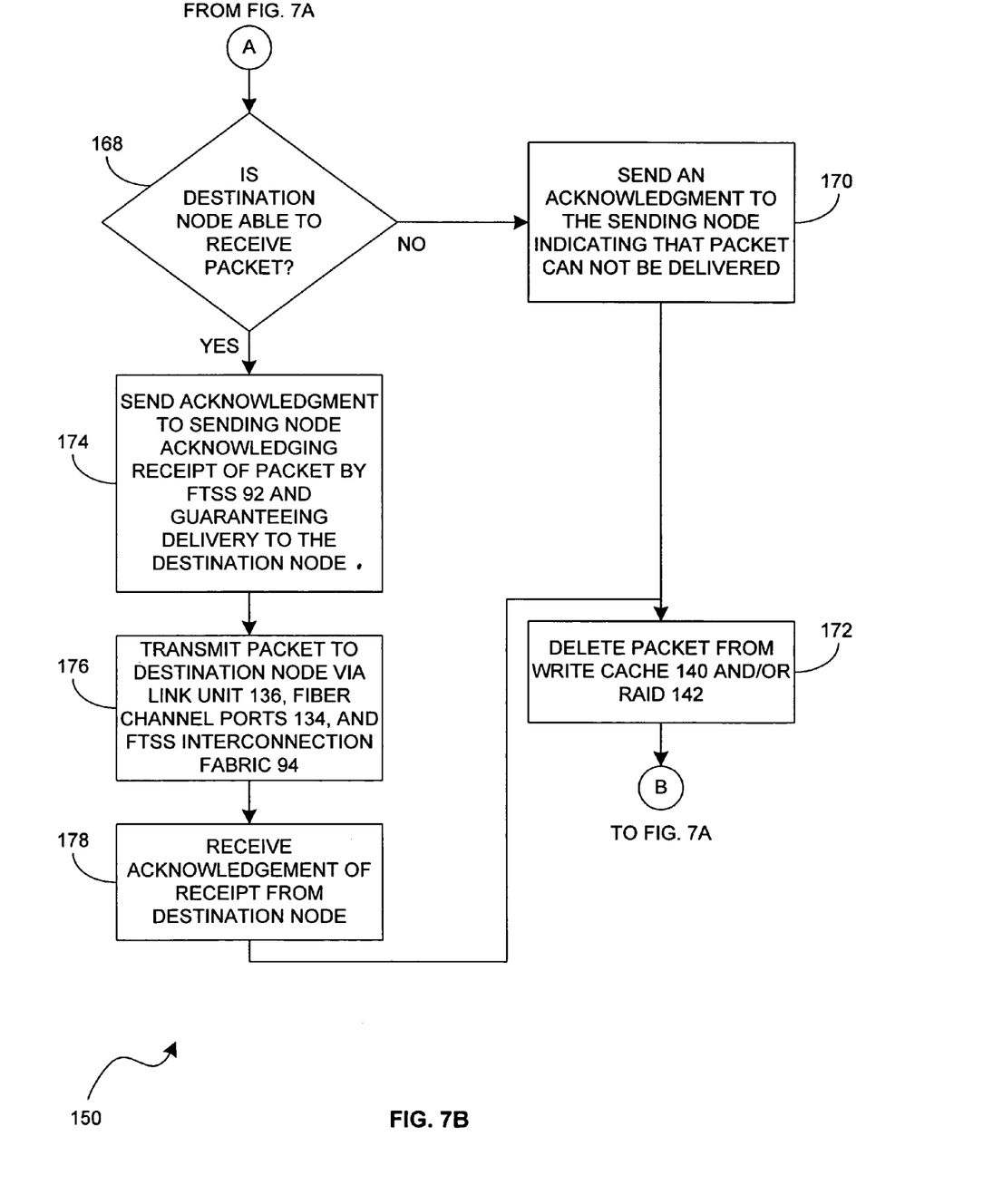
Figure 8:
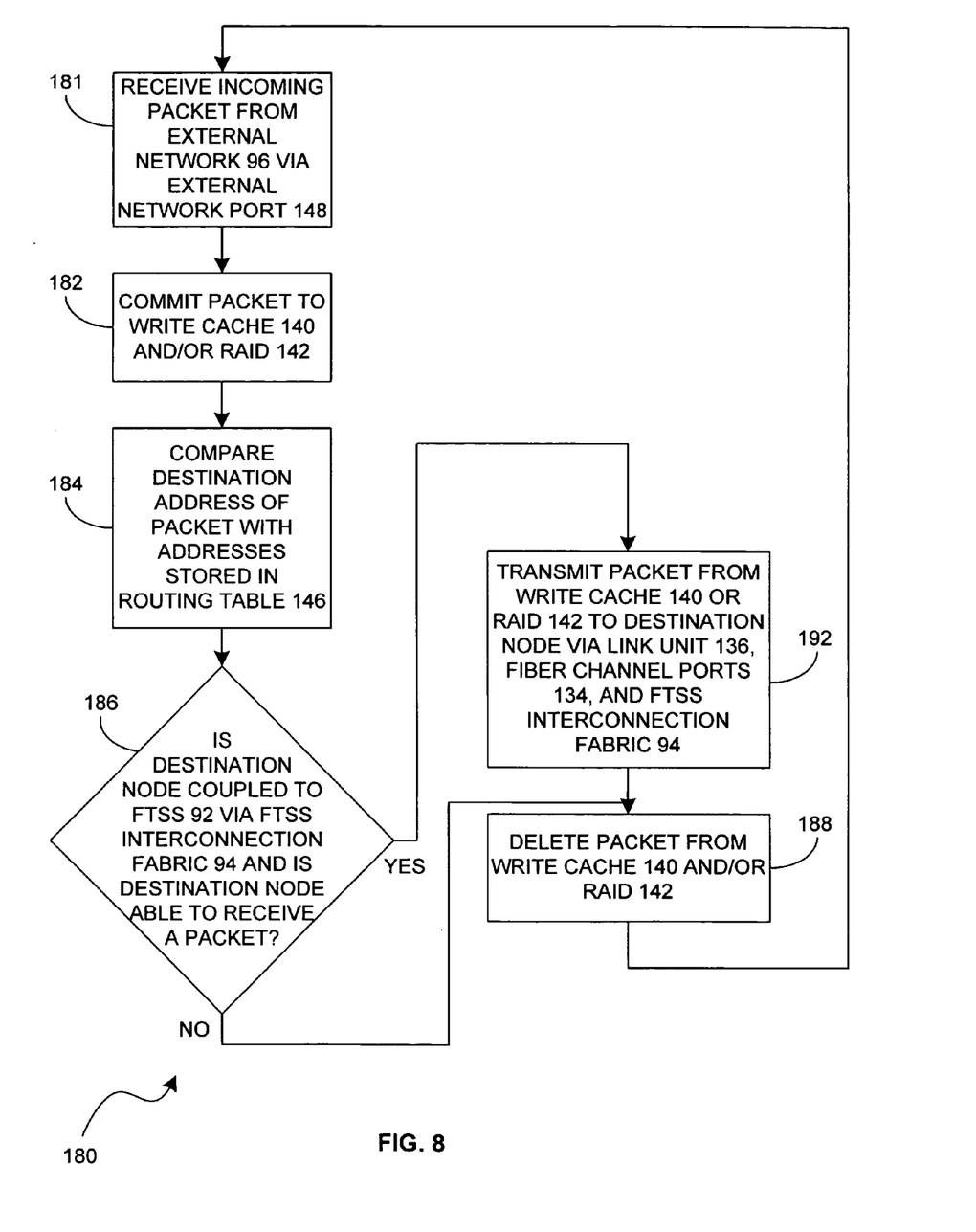
FIG. 8 is a flowchart that illustrates how an FTSS in accordance with the present invention processes incoming packets from external nodes.

FIGS. 7A and 7B, taken together, show a flowchart 150 that illustrates how FTSS network routing agent 144 processes incoming packets from nodes coupled to FTSS interconnection fabric 94, which are received by agent 144 from link unit 136. FIG. 8 is a flowchart 180 that illustrates how agent 144 processes incoming packets from external nodes coupled to external network 96, which are received by agent 144 from external network port 148.

Before considering FIGS. 7A, 7B, and 8, first consider that FTSS 92 provides many levels of redundancy. For example, if a RAID controller in RAID 142 fails while data is being transferred from nonvolatile write cache 140 to RAID 142, the data is written to RAID 142 using a redundant RAID controller. Similarly, if a fiber channel interface fails while transmitting a packet to a destination node, the packet will be transmitted using a redundant interface. As discussed above, the Hewlett-Packard SureStore® XP512 Disk Array has a mean time between failure (MTBF) of 285 years. Since FTSS 92 has many mechanisms to ensure reliable and fault tolerant data transfer, the steps that implement these mechanisms are not shown in flowcharts 150 and 180.

As mentioned above, FIGS. 7A and 7B, taken together, show a flowchart 150 that illustrates how FTSS network routing agent 144 processes incoming packets from nodes coupled to FTSS interconnection fabric 94. At block 152, agent 144 receives an incoming packet, and passes control to block 154. Block 154 commits the packet to write cache 140. Thereafter, block 154 may also store the packet in RAID 142, and if it does, the packet can optionally be removed from cache 140. The important function provided by block 154 is that the incoming packet is stored in a fault-tolerant medium and is guaranteed to be available for transmission to the destination node. Next, control passes to block 156.

Block 156 compares the destination address of the packet with addresses stored in routing table 146. Basically, routing table 156 stores any pertinent information related to the network nodes coupled to FTSS interconnection fabric 94, such as the port number of the fiber channel port coupled to the destination node, status information of the destination node, and the like. Control then passes to decision block 158, which determines whether the destination node is coupled to FTSS 92 via interconnection fabric 94 or external network 96. In other words, was the destination address of the packet found in routing table 156. If the answer is yes, then the "FTSS" branch is taken to decision block 168 in FIG. 7B via label A.

However, first consider that the destination address is the address of an external node coupled to external network 96. In this case, the "EXTERNAL" branch is taken to block 160. Block 160 sends an external network acknowledgment to the sending node indicating that the packet has bee received by FTSS 92, stored in a fault-tolerant medium, and will be transmitted to the destination node. However, delivery can not be guaranteed because the external network node is not within the domain of FTSS 92. Control then passes to block 164, which transmits the packet from write cache 140 or RAID 142 to the destination node via external network port 148 and external network 96.

Note that external network 96 is depicted in a generic manner. If external network 96 is an Ethernet network, then the packet is transmitted into the collision domain of the Ethernet network and is processed like any other packet transmitted by an external node coupled to the Ethernet network. Alternatively, external network 96 could represent a TCP/IP network such as the Internet, in which case the packet could be transmitted to a default gateway to begin the process of routing the packet to its final destination. Those skilled in the art will understand how to transmit the packet to external network 96 based on the characteristics of the external network.

Also note that if external network 96 is an Ethernet network, it may be desirable to echo all network traffic flowing between the servers in FIG. 4 to external network 96 to maintain the collisions semantics of the Ethernet protocol on network 96. In addition, when processing broadcast messages, it may be desirable to take both the "EXTERNAL" and "FTSS" branches from decision block 158.

After the packet is transmitted, control passes to block 166, where the packet is deleted from the fault-tolerant medium where it is stored, such as write cache 140 or RAID 142. Control then passes back to block 152 to receive the next packet from link unit 136. As discussed above, it may be desirable to retain packets for a certain length of time in a packet queue. If this is desired, then the packet would not be immediately deleted at step 166. Rather, the packet can be deleted at a latter time, as discussed above. Also, if the packet is a broadcast packet, the packet will not be deleted until it has been transmitted to all nodes.

Returning to decision block 158, assume that the destination node is coupled to FTSS 92 via fabric 94. The "FTSS" branch is taken to decision block 168 in FIG. 7B via label A. Decision block 168 determines whether the destination node is able to receive a packet. Normally, the answer will be yes since the entire system is highly reliable and fault-tolerant. However, if the destination node is not available for some reason (e.g., the destination node has been powered down for maintenance or configuration), the "NO" branch is taken to block 170. Block 170 sends an acknowledgment to the sending node indicating that the packet can not be delivered. Control then passes to block 172, which deletes the packet from write cache 140 and/or RAID 142, and control then passes back to block 152 in FIG. 7A via label B. Note that the packet may be deleted later, as described above with reference to block 166.

Returning to decision block 168, if the destination node is able to receive the packet, the "YES" branch is taken to block 174, which sends an acknowledgment to the sending node acknowledging receipt of the packet by FTSS 92 and guaranteeing delivery of the packet to the destination node. Next, control passes to block 176, which transmits the packet to the destination node via link unit 136, fiber channel ports 134, and FTSS interconnection fabric 94. At block 178, agent 144 receives acknowledgment of receipt of the packet from the destination node. Thereafter, control passes to block 172, which deletes the packet from write cache 140 and/or RAID 142 (possible later, as discussed above), and then control passes back to block 152 in FIG. 7A via label B.

Note that saving the packet in write cache 140 or RAID 142 at block 152 effectively decouples the order of the acknowledgment to the sending node at block 174 from the transmission of the packet to the destination node at block 176. In other words, since FTSS 92 is guaranteeing delivery of the packet, delivery of the packet can be acknowledged to the sending node either before or after the destination node actually receives the packet.

FIGS. 7A and 7B illustrate how FTSS network routing agent 144 processes incoming packets received from nodes coupled to FTSS interconnection fabric 94. In contrast, flowchart 180 of FIG. 8 illustrates how agent 144 processes incoming packets from external nodes coupled to external network 96, which are received by agent 144 from external network port 148.

At block 181 of flowchart 180, an incoming packet is received from external network 96 via external network port 148. Next, control passes to block 182 and the packet is committed to write cache 140 and/or RAID 142. Control then passed to block 184, which compares the destination address of the packet with the addresses stored in routing table 146. Decision block 186 then determines whether the destination node is coupled to FTSS 92 via FTSS interconnection fabric 94, and whether the destination node is able to receive a packet. If the answer to either of these questions is no, the "NO" branch is taken to block 188, where the packet is deleted from write cache 140 and/or RAID 142. As discussed above, the packet may be deleted later. Control then passes back to block 181 to receive the next packet from external network 96. The "NO" branch will be taken, for example, if the external network is an Ethernet network, and the MAC address of the received packet does not match a MAC address of any of the nodes attached to FTSS 92 via fabric 94.

On the other hand, if the destination node is coupled to FTSS 92 via FTSS interconnection fabric 94 and if the destination node is able to receive a packet, the "YES" branch is taken to block 192. Block 192 transmits the packet from write cache 140 or raid 142 to the destination node via link unit 136, fiber channel ports 134, and FTSS interconnection fabric 94. Control then passes to block 188, where the packet is deleted from write cache 140 and/or RAID 142 (possible later, as discussed above), then control passes back to block 181 to receive the next packet from external network 96.

The present invention uses a fault tolerant storage system to also carry network traffic between nodes coupled the fault tolerant storage system. Accordingly, the present invention provides a customer with all of the reliability and fault-tolerant advantages of a proprietary network such as Compaq's ServerNet® or IBM's Coupling Facility, without requiring the customer to purchase any additional hardware.

Although the present invention has been described with reference to preferred embodiments, workers skilled in the art will recognize that changes may be made in form and detail without departing from the spirit and scope of the invention.

What is claimed is:

1. A method of transmitting a network packet from a source node to a destination node, wherein the source and destination nodes are coupled to a fault tolerant storage system (FTSS) via an FTSS interconnection fabric, the method comprising:
   transmitting the packet from the source node to the FTSS via the FTSS interconnection fabric;
   storing the packet in highly reliable fault-tolerant storage media of the FTSS; and
   transmitting the packet from the FTSS to the destination node via the FTSS interconnection fabric.

2. The method of claim 1 and further comprising:
   sending an acknowledgment from the FTSS to the source node guaranteeing delivery of the packet to the destination node.

3. The method of claim 1 and further comprising:
   sending an acknowledgment from the destination node to the FTSS acknowledging receipt of the packet at the destination node.

4. The method of claim 1 and further comprising:
   deleting the packet from the highly reliable fault-tolerant storage media after the packet has been transmitted to the destination node.

5. The method of claim 1 and further comprising:
   retaining the packet in a packet queue of the FTSS for a period of time after the packet has been transmitted to the destination node.

6. The method of claim 1 wherein the packet is transmitted from the source node to the FTSS, and from the FTSS to the destination node as a file I/O transaction.

7. The method of claim 1 wherein the packet is transmitted from the source node to the FTSS, and from the FTSS to the destination node by encapsulating the packet in a protocol of an interface used to implement the FTSS interconnection fabric.

8. The method of claim 1 wherein storing the packet in highly reliable fault-tolerant storage media of the FTSS comprises storing the packet in a nonvolatile write cache of the FTSS.

9. The method of claim 1 wherein storing the packet in highly reliable fault-tolerant storage media of the FTSS comprises storing the packet in a redundant array of independent disks of the FTSS.

10. A method of transmitting a network packet from a source node to a destination node, wherein the source node is coupled to a fault tolerant storage system (FTSS) via an FTSS interconnection fabric, and the destination node is coupled to the FTSS via an external network, the method comprising:
    transmitting the packet from the source node to the FTSS via the FTSS interconnection fabric;
    storing the packet in highly reliable fault-tolerant storage media of the FTSS; and
    transmitting the packet from the FTSS to the destination node via the external network.

11. The method of claim 10 and further comprising:
    sending an acknowledgment from the FTSS to the source node acknowledging that the FTSS has received the packet, but delivery of the packet to the destination node will be attempted but can not be guaranteed.

12. The method of claim 10 and further comprising:
    deleting the packet from the highly reliable fault-tolerant storage media after the packet has been transmitted to the destination node.

13. The method of claim 10 wherein the packet is transmitted from the source node to the FTSS as a file I/O transaction.

14. The method of claim 10 wherein the packet is transmitted from the source node to the FTSS by encapsulating the packet in a protocol of an interface used to implement the FTSS interconnection fabric.

15. The method of claim 10 wherein storing the packet in highly reliable fault-tolerant storage media of the FTSS comprises storing the packet in a nonvolatile write cache of the FTSS.

16. The method of claim 10 wherein storing the packet in highly reliable fault-tolerant storage media of the FTSS comprises storing the packet in a redundant array of independent disks of the FTSS.

17. A method of transmitting a network packet from a source node to a destination node, wherein the destination nodes is coupled to a fault tolerant storage system (FTSS) via an FTSS interconnection fabric, and the source node is coupled to the FTSS via an external network, the method comprising:

transmitting the packet from the source node to the FTSS via the external network;

storing the packet in highly reliable fault-tolerant storage media of the FTSS; and transmitting the packet from the FTSS to the destination node via the FTSS interconnection fabric.

18. The method of claim 17 and further comprising:

sending an acknowledgment from the destination node to the FTSS acknowledging receipt of the packet at the destination node.

19. The method of claim 17 and further comprising:

deleting the packet from the highly reliable fault-tolerant storage media after the packet has been transmitted to the destination node.

20. The method of claim 17 and further comprising:

retaining the packet in a packet queue of the FTSS for a period of time after the packet has been transmitted to the destination node.

21. The method of claim 17 wherein the packet is transmitted from the FTSS to the destination node as a file I/O transaction.

22. The method of claim 17 wherein the packet is transmitted from the FTSS to the destination node by encapsulating the packet in a protocol of an interface used to implement the FTSS interconnection fabric.

23. The method of claim 17 wherein storing the packet in highly reliable fault-tolerant storage media of the FTSS comprises storing the packet in a nonvolatile write cache of the FTSS.

24. The method of claim 17 wherein storing the packet in highly reliable fault-tolerant storage media of the FTSS comprises storing the packet in a redundant array of independent disks of the FTSS.

25. A networked system comprising:

a plurality of nodes;

a fault tolerant storage system (FTSS); and an FTSS interconnection fabric coupling the plurality of nodes to the FTSS;

wherein each node includes:

a network protocol stack for processing network I/O;

an interface for sending data to and receiving data from the FTSS interconnection fabric; and a packet conversion unit for linking the network protocol stack, thereby allowing network traffic to flow between the node and the FTSS via the FTSS interconnection fabric;

and wherein the FTSS includes:

nonvolatile fault-tolerant storage media for storing data;

a file operations unit for completing file I/O operations to the nonvolatile fault tolerant storage media; and a network routing agent for receiving packets from source nodes of the plurality of nodes, storing packets in the nonvolatile fault-tolerant storage media, and transmitting packets to destination nodes of the plurality of nodes.

26. The networked system of claim 25 wherein the network routing agent of the FTSS sends an acknowledgment to the packet conversion unit of the source node guaranteeing delivery of the packet to the destination node.

27. The networked system of claim 25 wherein the packet conversion unit of the destination node sends an acknowledgment to the networking routing agent of the FTSS acknowledging receipt of the packet at the destination node.

28. The networked system of claim 25 wherein the network routing agent of the FTSS deletes the packet from the nonvolatile fault-tolerant storage media of the FTSS after the packet has been transmitted to the destination node.

29. The networked system of claim 25 wherein the network routing agent of the FTSS retains the packet in a packet queue stored on the nonvolatile fault-tolerant storage media for a period of time after the packet has been transmitted to the destination node.

30. The networked system of claim 25 wherein packets are transmitted from source nodes to the FTSS, and from the FTSS to the destination nodes as file I/O transactions.

31. The networked system of claim 25 wherein packets are transmitted from source nodes to the FTSS, and from the FTSS to the destination nodes by encapsulating packets in a protocol of an interface used to implement the FTSS interconnection fabric.

32. The networked system of claim 25 wherein the nonvolatile fault-tolerant storage media of the FTSS includes a nonvolatile write cache.

33. The networked system of claim 25 wherein the nonvolatile fault-tolerant storage media of the FTSS comprises a redundant array of independent disks.

34. The networked system of claim 25 and further comprising an external network coupled to the FTSS, wherein the FTSS routes packets between the plurality of nodes coupled to the FTSS, and external nodes coupled to the external network.

35. A server comprising:

a plurality of applications and system utilities;

an interface for coupling the server to a fault tolerant storage system (FTSS); and I/O system services coupled between the plurality of applications and system utilities and the interface, the I/O system services including:

a file system for processing file I/O operations between the plurality of applications and system utilities and an FTSS via the interface; and a network protocol stack for processing network packets between the plurality of applications system and utilities and other network nodes; wherein the network protocol stack links into the file system to carry network packets to an FTSS via the interface.

36. A fault tolerant storage system (FTSS) comprising:

nonvolatile fault-tolerant storage media for storing data;

a file operations unit for completing file I/O operations to the nonvolatile fault tolerant storage media; and a network routing agent for receiving packets from source nodes coupled to the FTSS via an FTSS interconnection fabric, storing packets in the nonvolatile fault-tolerant storage media, and transmitting packets to destination nodes via the FTSS interconnection fabric.

* * * * *